(12) United States Patent
Matsui (10) Patent No.: US 10,699,656 B2
(45) Date of Patent: Jun. 30, 2020

(54) LUMINANCE ADJUSTMENT DEVICE, DISPLAY DEVICE AND LUMINANCE ADJUSTMENT METHOD

(71) Applicant: NEC Display Solutions, Ltd., Tokyo (JP)

(72) Inventor: Katsuyuki Matsui, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 0 days.

(21) Appl. No.: 16/349,200

(22) PCT Filed: Nov. 18, 2016

(86) PCT No.: PCT/JP2016/084258
§ 371 (c)(1),
(2) Date: May 10, 2019

(87) PCT Pub. No.: WO2018/092267
PCT Pub. Date: May 24, 2018

(65) Prior Publication Data
US 2019/0266969 A1    Aug. 29, 2019

(51) Int. Cl.
*G09G 3/34*        (2006.01)
*H05B 47/10*      (2020.01)
(Continued)

(52) U.S. Cl.
CPC .......... *G09G 3/3648* (2013.01); *G02F 1/133* (2013.01); *G09G 3/34* (2013.01); *G09G 3/36* (2013.01);
(Continued)

(58) Field of Classification Search
CPC .......... G09G 3/3648; G09G 3/34; G09G 3/36; G09G 2320/0233; G09G 2320/043; H05B 47/10; G02F 1/133; Y02B 20/42
See application file for complete search history.

(56) References Cited

U.S. PATENT DOCUMENTS 7,303,286 B2 * 12/2007 Ishikura .................. G02B 5/04
                                                                     348/771
8,550,633 B2 * 10/2013 Utsunomiya .......... G02B 27/48
                                                                     349/64

(Continued)

FOREIGN PATENT DOCUMENTS

JP    H 06-167695 A    6/1994
JP    2008-311008 A   12/2008

OTHER PUBLICATIONS

International Search Report (ISR) (PCT Form PCT/ISA/210), in PCT/JP2016/084258, dated Jan. 24, 2017.

*Primary Examiner* — Ricardo Osorio
(74) *Attorney, Agent, or Firm* — McGinn IP Law, PLLC (57) ABSTRACT

A luminance adjustment device is configured to adjust the luminance of a light source of a display by controlling a drive value of the light source of the display. The luminance adjustment device is configured to calculate the luminance corresponding to the used time of the light source according to a predetermined luminance characteristic, to calculate the drive value according to the luminance, to correct and add up the used time of the light source using a cubic value of the drive value, to correct the luminance according to the predetermined luminance characteristic based on a total used time, and to thereby correct the drive value.

9 Claims, 6 Drawing Sheets

(51) Int. Cl.
*G09G 3/36* (2006.01)
*G02F 1/133* (2006.01)

(52) U.S. Cl.
CPC ..... *H05B 47/10* (2020.01); *G09G 2320/0233* (2013.01); *G09G 2320/043* (2013.01); *Y02B 20/42* (2013.01)

(56) References Cited

U.S. PATENT DOCUMENTS

| | | | |
|---|---|---|---|
| 9,411,219 B2* | 8/2016 | Osaka | F21V 13/12 |
| 2006/0208670 A1* | 9/2006 | Chang | H05B 41/3921 |
| | | | 315/360 |
| 2012/0013763 A1* | 1/2012 | Umeda | H04N 9/643 |
| | | | 348/223.1 |
| 2018/0061331 A1* | 3/2018 | Ikeda | G09G 3/342 |

* cited by examiner

LUMINANCE ADJUSTMENT DEVICE, DISPLAY DEVICE AND LUMINANCE ADJUSTMENT METHOD

TECHNICAL FIELD

The present invention relates to a luminance adjustment device, a display device, and a luminance adjustment method.

BACKGROUND ART

Backlights of display devices will gradually decrease in luminance due to aging and deterioration. For this reason, display devices suffer from a problem that backlight luminance becomes lower than a setting value a half year or one year later than the timing at which backlight luminance was adjusted to a desired setting value.

To solve the problem, for example, it is possible to introduce a method in which a luminance sensor is used to measure the luminance of a backlight so as to correct the backlight luminance such that its measured value will match the setting value. However, this method needs to use a luminance sensor with a relatively high cost. In addition, the luminance sensor including precision optical parts may easily cause an erroneous operation due to dirt, discoloration, and deformation.

CITATION LIST

Patent Document

Patent Document 1: Japanese Patent Application Publication No. H06-167695

SUMMARY OF INVENTION

Technical Problem

A reduction of luminance due to degradation of a backlight may be caused by different characteristics of degradation due to a user's setting of picture quality for a display device and a usage status of a display device which is controlled responsive to video characteristics of videos input thereto. Patent Document 1 discloses a method for applying a voltage to a backlight depending on its driving time, whereas the luminance of a backlight may be corrected excessively or insufficiently due to different usage statuses of a display device even when its backlight is driven in the same driving time; this may reduce a precision of luminance corrections.

The present invention is made in the aforementioned circumstances, and therefore the present invention aims to provide a luminance adjustment device, a display device, and a luminance adjustment method, which can improve the precision of luminance corrections for a backlight without using a luminance sensor.

Solution to Problem

According to one aspect of the present invention, a luminance adjustment device is configured to adjust the luminance of a light source of a display by controlling a drive value used to drive the light source of the display in conformity with a target value. The luminance adjustment device includes a degradation correction part configured to correct the used time of the light source using a cubic value of the drive value, to add up the corrected used times and thereby produce a total used time of the light source, and to produce the drive value according to the total used time and a luminance characteristic, which is stored in advance to represent the relationship between the luminance and the used time of the light source.

According to one aspect of the present invention, the luminance adjustment device further includes an initial value generator configured to set an initial value of the drive value according to the usage status of the display. The degradation correction part is configured to acquire from the luminance characteristic a luminance corresponding to the total used time serving as the used time of the luminance characteristic and thereby produces the drive value according to the luminance and the initial value of the drive value.

According to one aspect of the present invention, the luminance adjustment device is designed such that the usage status of the display is determined based on at least one of a picture-quality setting value of the display and a video characteristic of a video input to the display.

According to one aspect of the present invention, the luminance adjustment device is designed such that the drive value and the luminance are each expressed as a normalized value whose maximum value is normalized to "1" when an input video is displayed on the display using the light source.

According to one aspect of the present invention, the luminance adjustment device is designed such that, upon a lapse of a predetermined time, the degradation correction part is configured to correct the used time of the light source using the cubic value of the drive value, and add up the corrected used times to update the total used time.

According to one aspect of the present invention, the luminance adjustment device is designed such that the luminance is adjusted to be maintained.

According to one aspect of the present invention, a display device includes the aforementioned luminance adjustment device, and a display.

According to one aspect of the present invention, a luminance adjustment method is configured to adjust the luminance of a light source of a display by controlling a drive value used to drive the light source of the display in conformity with a target value. The luminance adjustment method includes the steps of: correcting the used time of the light source using a cubic value of the drive value; adding up the corrected used times to thereby produce a total used time of the light source; and producing the drive value according to the total used time and a luminance characteristic, which is stored in advance to represent a relationship between the luminance and the used time of the light source.

Advantageous Effects of Invention

According to the present invention described above, it is possible to improve a precision of luminance corrections for a backlight without using a luminance sensor.

DESCRIPTION OF EMBODIMENT

Hereinafter, the present invention will be described by way of the embodiments, whereas the following embodiments do not intend to limit the invention as defined in claims. In addition, all the combinations of features explained in the embodiments are not necessarily essential to solving means of the invention. In the embodiments, same or similar parts are denoted using the same reference signs; hence, duplicate descriptions may be omitted as necessary. Moreover, the shape and the size of elements in the drawings may be expanded to clearly describe elements.

In the entirety of the description, the phrase reciting a certain part which "includes", "has", or "comprises" another constituent element does not intend to preclude other elements unless otherwise stated; hence, the phrase may embrace a meaning that a certain part may further include other constituent elements.

For example, a luminance adjustment device according to one embodiment of the present invention is designed to control a drive value (hereinafter, referred to as "BL-drive value"), which is used to control a luminance of a display such as a backlight (hereinafter, referred to as "BL") in conformity with a target value, thus maintaining its BL luminance. In this connection, the BL-drive value is a control value for changing the luminance of a display such as an electric current, a voltage, power, and a duty ratio of PWM (Pulse Width Modulation) applied to a light source of a display. For example, the luminance of a display increases when the BL-drive value becomes a high value, whereas the luminance of a display decreases when the BL-drive value becomes a low value. According to the present embodiment, the BL-drive value has a normalized value ranging from "0" to "1", wherein "1" indicates the maximum luminance of a display while "0" indicates the minimum luminance of a display (e.g. a light-out state).

Hereinafter, a display device including a luminance adjustment device according to one embodiment of the invention will be described with reference to the drawings.

Figure 1:
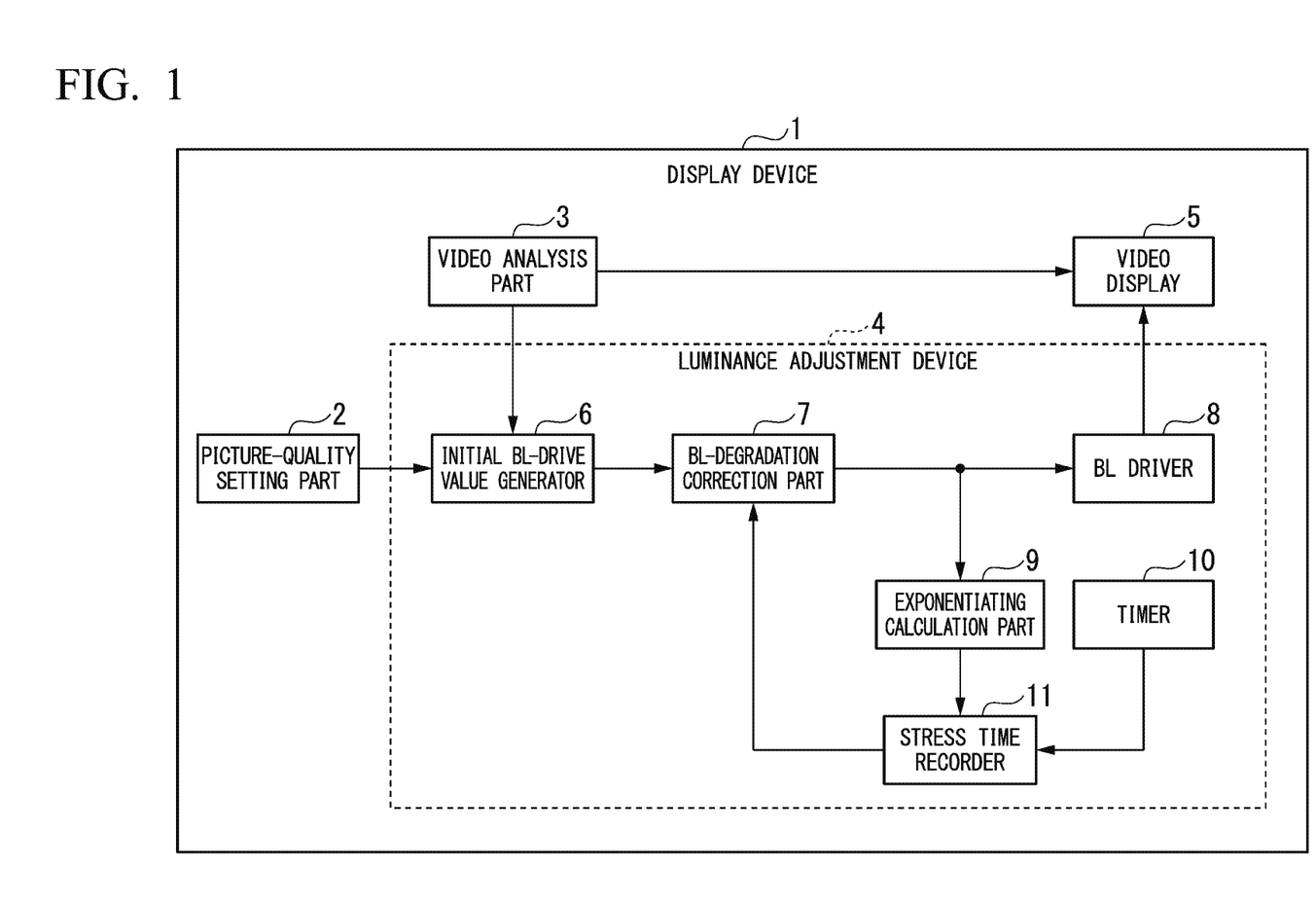
FIG. 1 is a block diagram showing an example of an overview configuration of a display device 1 including a luminance adjustment device 4 according to one embodiment of the invention.

FIG. 1 is a block diagram showing an example of an overview configuration of a display device 1 including a luminance adjustment device 4 according to one embodiment of the present invention.

As shown in FIG. 1, the display device 1 includes a picture-quality setting part 2, a video analysis part 3, the luminance adjustment device 4, and a video display 5. The video display 5 may exemplify a display.

The picture-quality setting part 2 is configured to determine a setting value with respect to a picture quality of the video display 5, which is input via a user's operation. Herein, a picture quality setting indicates a brightness setting. Brightness is set to change power consumption of a backlight, wherein the screen is displayed to be brighter when the brightness has a large value while the screen is displayed to be darker when the brightness has a small value. Alternatively, the picture quality setting may indicate a setting of a power-saving mode for a backlight. It is possible to set a mode (e.g. a high luminance mode) for displaying the screen brightly with a backlight having large power consumption or another mode (e.g. a power-saving mode) for displaying the screen darkly with a backlight having small power consumption. That is, the picture quality setting indicates how to set a value of power for a light source.

The video analysis part 3 is configured to acquire a video characteristic of a video signal by analyzing the video signal input to the video display 5. For example, the video characteristic indicates an average value of brightness on the screen of the video display 5. For example, it is possible to carry out dimming control of power applied to a light source such that the light source is increased in luminance when an input video is bright while the light source is decreased in luminance when an input video signal is dark. In this connection, an input video signal may correspond to a video input from an external device such as a personal computer and a video device.

The luminance adjustment device 4 controls a BL-drive value, which is used to control the luminance of a backlight (or a light source) installed in the video display 5, in conformity with a target value, thus maintaining the luminance of the video display 5.

The video display 5 displays a video given by the video analysis part 3 under the control of the luminance adjustment device 4. For example, the video display 5 includes a display panel such as an LCD (Liquid Crystal Display) and a micro-mirror device, and a backlight serving as a light source for illuminating the display panel.

The feature of the luminance adjustment device 4 according to one embodiment of the present invention will be described below.

Figure 2:
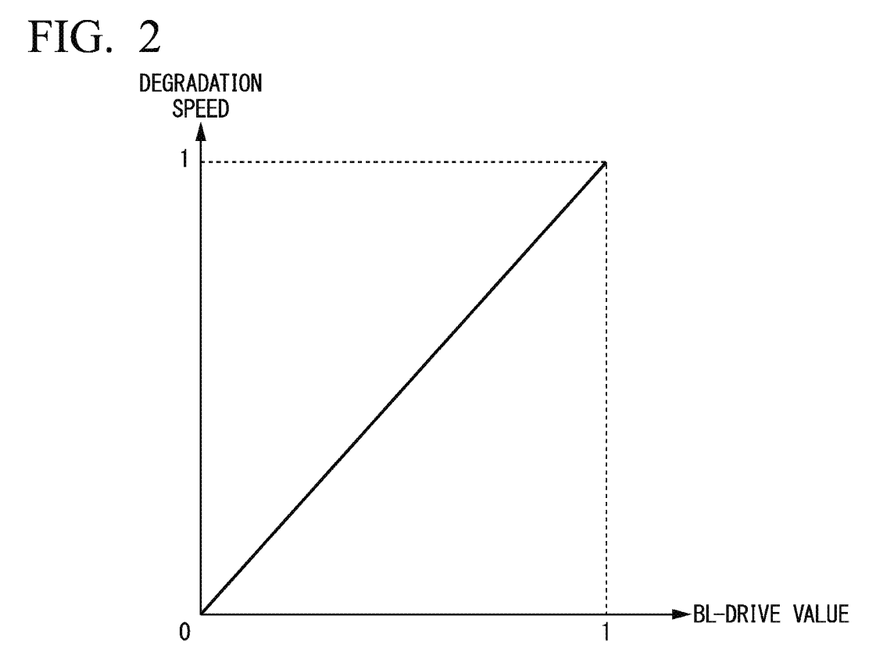
FIG. 2 is a graph showing the relationship between degradation speed and a BL-drive value of a video display 5 with respect to "light quantity".
Figure 3:
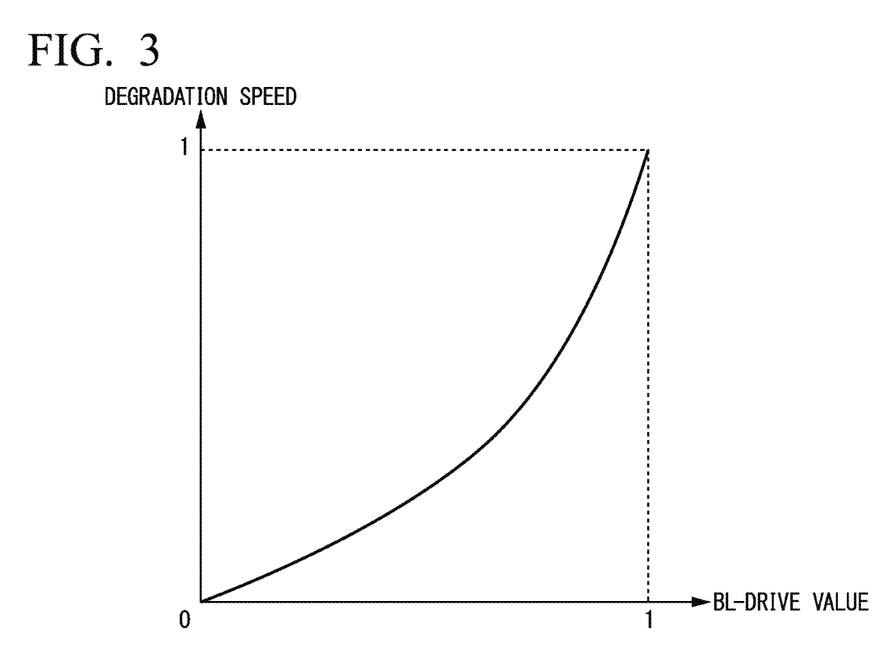
FIG. 3 is a graph showing the relationship between degradation speed and a BL-drive value of the video display 5 with respect to "temperature".

As described above, a reduction of a BL-drive value may cause a reduction of "light quantity" and "temperature" serving as main factors of degradation in a light source of the video display 5 such as LEDs (Light Emitting Diodes) (in particular, packages, resin sealings, fluorescent substances). The degradation characteristics of the video display 5 due to "light quantity", "temperature", and their variations can be assumed according to the Arrhenius equation. In this connection, FIG. 2 is a graph showing the relationship between degradation speed and a BL-drive value of the video display 5 with respect to "light quantity". FIG. 3 is a graph showing the relationship between degradation speed and a BL-drive value of the video display 5 with respect to "temperature".

As shown in FIG. 2, the degradation speed due to "light quantity" may substantially be a linear function of the BL-drive value. For example, "light quantity" may increases in proportion to the BL-drive value, wherein the degradation speed will be halved every time the BL-drive value becomes a half value.

As shown in FIG. 3, the degradation speed due to "temperature" may substantially be a quadratic function of the BL-drive value. For example, a product life will be doubled every time the temperature of LEDs serving as a light source of the video display 5 is decreased by ten degrees (e.g. an LED-temperature increase of 50 degrees at 100% of a BL-current). Assuming that the temperature due to the maximum BL-drive value is room temperature plus fifty degrees, the degradation speed will be halved every time the BL-drive value is decreased by 20%. In other words, the degradation speed is accelerated due to an increase of the BL-drive value.

Figure 4:
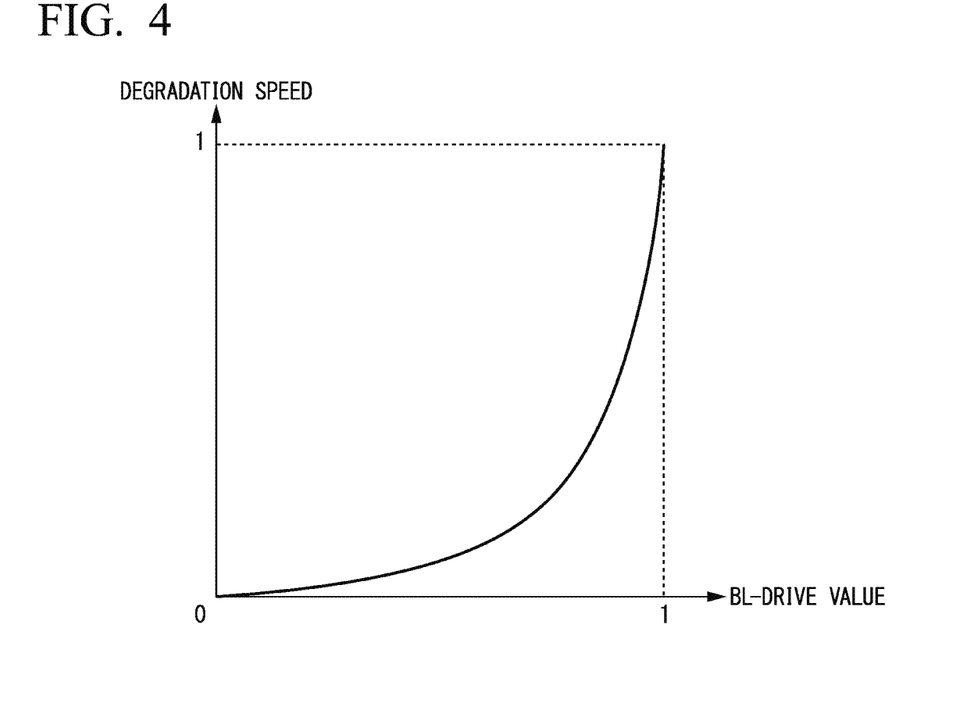
FIG. 4 is a graph showing a total characteristic combining the relationships between degradation speed and BL-drive values shown in FIGS. 2 and 3.

FIG. 4 shows a total characteristic combining the relationships between degradation speed and BL-drive values in consideration of "light quantity" and "temperature", i.e. a total characteristic combining the relationships between degradation speed and BL-drive values shown in FIGS. 2 and 3, wherein the total characteristic can be approximated as a cubic expression in which the driving time of the video display 5 is multiplied by the cubic value of the BL-drive value (i.e. the BL-drive value multiplied by itself triple). One feature of the luminance adjustment device 4 according to one embodiment of the present invention is to calculate an appropriate BL-drive value for a light source of the video display 5 by taking into account the luminance degradation characteristics considering "light quantity" and "temperature" using the cube of the BL-drive value.

The overview configuration of the luminance adjustment device 4 according to one embodiment of the present invention will be described below. The luminance adjustment device 4 includes an initial Bl-drive value generator 6 (or an initial value generator), a BL-degradation correction part 7 (or a degradation correction part), a BL driver 8, an exponentiating calculation part 9, a timer 10, and a stress-time recorder 11.

The initial BL-drive value generator 6 generates an initial value I(0) of a BL-drive value based on the usage status of the video display 5. For example, the usage status of the video display 5 represents at least one of a picture-quality setting value of the video display 5 and a video characteristic of a video signal input to the video display 5. That is, the usage status of the video display 5 represents the status of using a backlight with a setting or a signal for changing the luminance of a backlight installed in the video display 5.

For example, the initial BL-drive value generator 6 acquires a picture-quality setting value, which is set by a user, from the picture-quality setting part 2. In addition, the initial BL-drive value generator 6 acquires a video characteristic from the video analysis part 3. Accordingly, the initial BL-drive value generator 6 generates an initial value I(0) of a BL-drive value based on the picture-quality setting value and the video characteristic.

In this connection, for example, the initial BL-drive value generator 6 may determine the initial value I(0) of a BL-drive value according to a calculation equation or a table which is predetermined based on the usage status of the video display 5. For example, it is possible to experimentally or theoretically determine the calculation equation and the table such that the initial value I(0) of the BL-drive value can be determined based on at least one of the picture-quality setting value of the video display 5 and the video characteristic of a video signal input to the video display 5. As the predetermined table, it is possible to store in advance on an unillustrated storage media a lookup table describing various usage statuses of the video display 5 and initial values I(0) of BL-drive values correlated to usage statuses. The initial BL-drive value generator 6 generates the initial value I(0) of the BL-drive value by retrieving from the lookup table the initial value I(0) of the BL-drive value relating to the usage status which is acquired from the picture-quality setting part 2 or the video analysis part 3. To correct the degradation of the luminance due to aging over time, it is preferable to set the initial value I(0) to a small value less than "1". For example, the initial value I(0) is set to 0.7.

The initial BL-drive value generator 6 generates and outputs the initial value I(0) of the BL-drive value to the BL-degradation correction part 7.

After a lapse of a predetermined time counted from the timing of turning on power with the video display 5 (e.g. the timing of turning on a backlight), the BL-degradation correction part 7 corrects the used time of a backlight (i.e. a light source) of the video display 5 based on the cubic value of the BL-drive value and an integrated value of the driving time of the video display 5 by way of prediction using the preset usage status of the video display 5.

Accordingly, the BL-degradation correction part 7 calculates an integrated used time of a light source which is produced by integrating the corrected used time (hereinafter, referred to as "stress time value"). Subsequently, the BL-degradation correction part 7 calculates a BL-drive value using the integrated used time and the characteristic of the video display 5 stored in advance (e.g. a degradation characteristic shown in the left side of FIG. 7). As the characteristic of the video display 5, for example, it is possible to use a luminance characteristic representing the relationship between the used time of a light source and its luminance.

Figure 5:
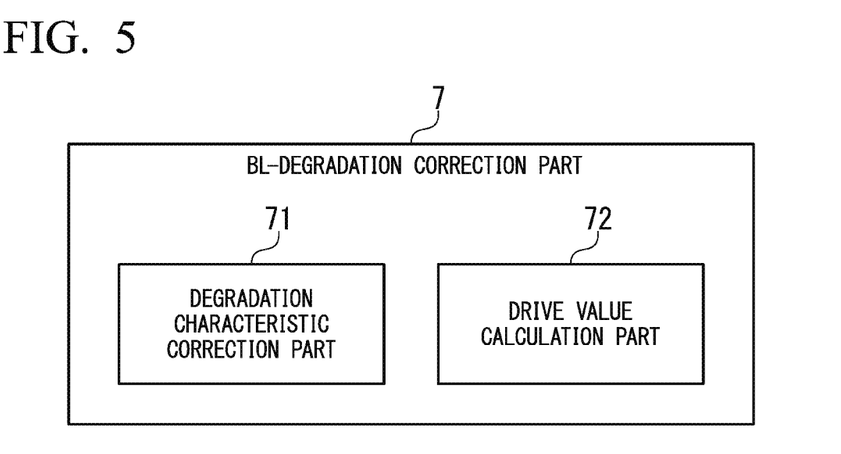
FIG. 5 is a block diagram showing an example of an overview configuration of a BL-degradation correction part 7 according to one embodiment of the present invention.

FIG. 5 is a block diagram showing an example of an overview configuration of the BL-degradation correction part 7 according to one embodiment of the present invention. As shown in FIG. 5, the BL-degradation correction part 7 includes a degradation characteristic correction part 71 and a drive-value calculation part 72.

The degradation characteristic correction part 71 reads a current stress time T(n) from the stress time recorder 11. The stress time T(n) is a variable which increases according to the BL-drive value and the driving time for driving the video display 5 (i.e. the used time of a backlight), wherein the stress time T(n) is zero at a start timing to drive the video display 5 (e.g. a start timing to operate a product).

The degradation characteristic correction part 71 calculates a current luminance L (ranging from "0" to "1") of the video display 5 using the stress time T(n) and a preset degradation coefficient β. The degradation coefficient β is a half time of luminance when the video display 5 is driven using the maximum BL-drive value, which is expressed by the following equation.

$$\beta = -\ln(0.5)/k \tag{1}$$

In the above, "ln" represents a natural logarithm. In addition, "k" represents a half time of luminance when the video display 5 is driving using the maximum BL-drive value.

Therefore, the degradation characteristic correction part 7 calculates the current luminance L (ranging from "0" to "1") according to the following equation using the preset degradation coefficient β and the stress time T(n).

$$L = e^{\beta \times T(n)} \tag{2}$$

Equation (2) is an example of a luminance characteristic representing the relationship between the luminance and the used time of a light source. Herein, T(n) corresponds to the used time of a backlight.

The drive value calculation part 72 calculates a BL-drive value I(n) using the initial value I(0) of the BL-drive value and the current luminance L calculated by the degradation characteristic correction part 71. For example, the drive value calculation part 72 calculates the BL-drive value I(n) according to the following equation using the initial value I(0) of the BL-drive value and the current luminance L calculated by the degradation characteristic correction part 71.

$$I(n)=\text{Min}(1,I(0)/L) \quad (3)$$

In the above, an expression of Min (1, I(0)/L) is a process to output a smaller value between "1" and "I(0)/L". Equation (3) prevents a BL-drive value from becoming larger than "1". That is, it prevents an excessive current from flowing through a backlight. In this connection, it is possible to calculate a BL-drive value I(n)=I(0)/L without considering an excessive current. The case in which a BL-drive value I(n) becomes equal to or more than "1" may indicate that an amount of luminance on the video display 5 becomes short of a target value of luminance. In this case, it is possible to warn a user of a correction limit as the information representing the shortage of luminance on the video display 5. This warning can be made using a sound, a warning signal, or a signal lamp to be turned on; hence, it is possible to employ various manners as warnings.

Referring back to FIG. 1, the drive value calculation part 72 calculates and outputs the BL-drive value I(n) to the BL driver 8 and the exponentiating calculation part 9.

The BL driver 8 drives the video display 5 by turning on a light source of the video display 5 while changing any one of values such as an electric current, a voltage, power, and a lighting time (PWM) according to the BL-drive value I(n) output from the drive value calculation part 72. As described above, the BL-drive value is normalized in a range from "0" to "1", wherein "1" represents maximum luminance while "0" represents minimum luminance.

The timer 10 checks a predetermined time Δh (e.g. ten hours) after the start timing to drive the video display 5 (i.e. at the timing to turn on a backlight).

The exponentiating calculation part 9 acquires the current BL-drive value I(n) output from the drive value calculation part 72. The exponentiating calculation part 9 calculates the cubic value of the BL-drive value I(n), i.e. $I^3(n)$. In this connection, the cubic value of $I^3(n)$ should range from "0" to "1" since the BL-drive value I(n) ranges from "0" to "1". The exponentiating calculation part 9 calculates the cubic value of $I^3(n)$, corresponding to the cube of the BL-drive value I(n), every time the predetermined time Δh has elapsed after the start timing to drive the video display 5.

The stress time recorder 11 produces a stress time value by adding a previous stress time value to a product of multiplying the predetermined time Δh and the cubic value of $I^3(n)$ calculated by the exponentiating calculation part 9, thus updating the stress time value every time the predetermined time Δh has elapsed after the previous timing.

Specifically, the stress time recorder 11 receives from the timer 10 a timing-completion signal representing that the predetermined time Δh has elapsed after recording the previous stress time value T(n−1). Upon receiving the timing-completion signal, the stress time recorder 11 acquires the cubic value of $I^3(n)$ from the exponentiating calculation part 9. The stress time recorder 11 updates and records the stress time value T(n) according to the following equation. In other words, an updating process would be equivalent to a process of correcting the used time of a light source using the cubic value of $I^3(n)$ of the BL-drive value, adding up the corrected used times, and thereby producing a total used time of a light source.

$$T(n)=T(n-1)+\Delta h \times I^3(n) \quad (4)$$

As described above, the predetermined time Δh is an elapsed time that has elapsed from the timing of recording the previous stress time value received from the timer 10. For example, the predetermined time Δh is set to "10" with respect to ten hours.

Therefore, the degradation characteristic correction part 71 calculates the current luminance L (ranging from "0" to "1") according to Equation (2) using the updated stress time value T(n). In other words, the degradation characteristic correction part 71 corrects the used time of a light source using the cubic value of $I^3(n)$ of the BL-drive value, adds up the corrected used times, and thereby produces a total used time of a light source.

The degradation characteristic correction part 71 assumes the total used time of a light source as the used time (T(n)) according to the luminance characteristic (Equation (2)), calculates the luminance corresponding to the used time according to the luminance characteristic (Equation (2)), and thereby produces a new BL-drive value based on the luminance L and the initial value I(0) of the BL-drive value.

An adjustment method (hereinafter, referred to as a "luminance adjustment method") of the luminance adjustment device 4 for maintaining the luminance of the video display 5 will be described below.

Figure 6:
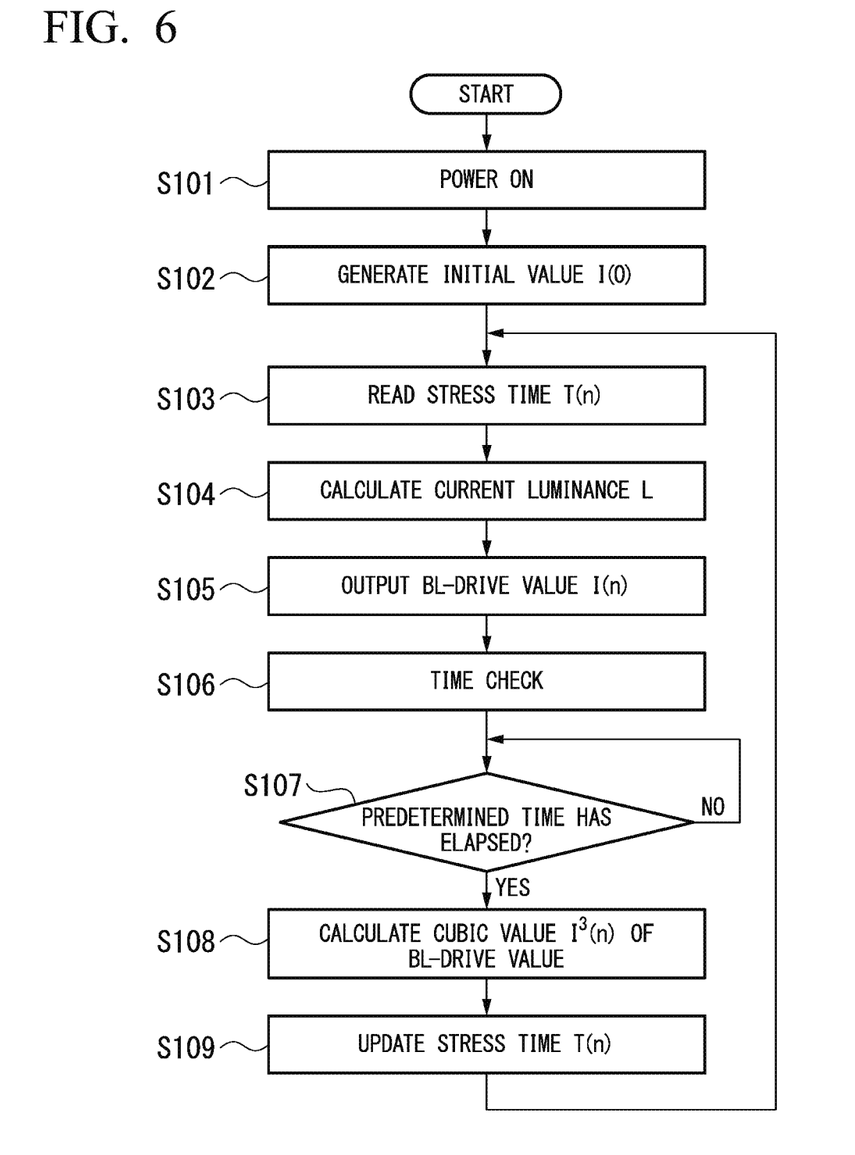
FIG. 6 is a flowchart used to explain a flow of processes executed by a luminance adjustment device 4 according to one embodiment of the present invention.

FIG. 6 is a flowchart used to explain a flow of processes executed by the luminance adjustment device 4 according to one embodiment of the present invention.

When a user turns on power with the video display 5 (step S101), the initial BL-drive value generator 6 generates the initial value I(0) of the BL-drive value according to the usage status of the video display 5 (step S102).

The degradation characteristic correction part 7 reads the current stress time value T(n) from the stress time recorder 11 (step S103). The degradation characteristic correction part 71 calculates the current luminance L on the video display 5 according to Equation (2) using the preset degradation coefficient β and the stress time value T(n) (step S104).

The drive value calculation part 72 calculates the BL-drive value I(n) according to Equation (3) using the initial value I(0) of the BL-drive value and the current luminance L calculated by the degradation characteristic correction part 71 (step S105). The drive value calculation part 72 outputs the BL-drive value I(n) to the BL driver 8 and the exponentiating calculation part 9. The BL driver 8 drives the video display 5 according to the BL-drive value output from the drive value calculation part 72.

The timer 10 checks the predetermined time Δh (e.g. ten hours) after the start timing to drive the video display 5 (step S106).

The exponentiating calculation part 9 determines whether or not the predetermined time Δh has elapsed from the start timing to drive the video display 5 (step S107), and therefore the exponentiating calculation part 9 calculates the cubic value $I^3(n)$ of the current BL-drive value I(n) when the predetermined time Δh has elapsed from the start timing (step S108). Upon receiving the timing-completion signal from the timer 10, for example, the exponentiating calculation part 9 may determine that the predetermined time Δh has elapsed from the start timing to drive the video display 5.

Upon receiving the timing-completion signal from the timer 10, the stress time recorder 11 acquires the cubic value $I^3(n)$ from the exponentiating calculation part 9. Subsequently, the stress time recorder 11 updates and records the stress time value T(n) according to Equation (4) (step S109). Upon completion of the process of step S109 with the stress time recorder 11, the flow proceeds to step S103. As described above, the luminance adjustment device 4 repeats a series of steps S103 to S109. In this connection, the flow returns back to the process of step S102 when the usage status of the video display 5 such as the picture-quality setting value and the input video has been changed after the process of step S109.

It is possible to carry out a process to turn off power by way of an interrupt process in step S107. In addition, it is possible to carry out a process to turn off power such that power is turned off after storing the checked time in step S106, and then the checked time stored in step S106 is read out after turning on power again, thus restarting to check time from the readout of the checked time.

Next, the effect of the luminance adjustment device 4 according to one embodiment of the present invention will be described below.

Figure 7:
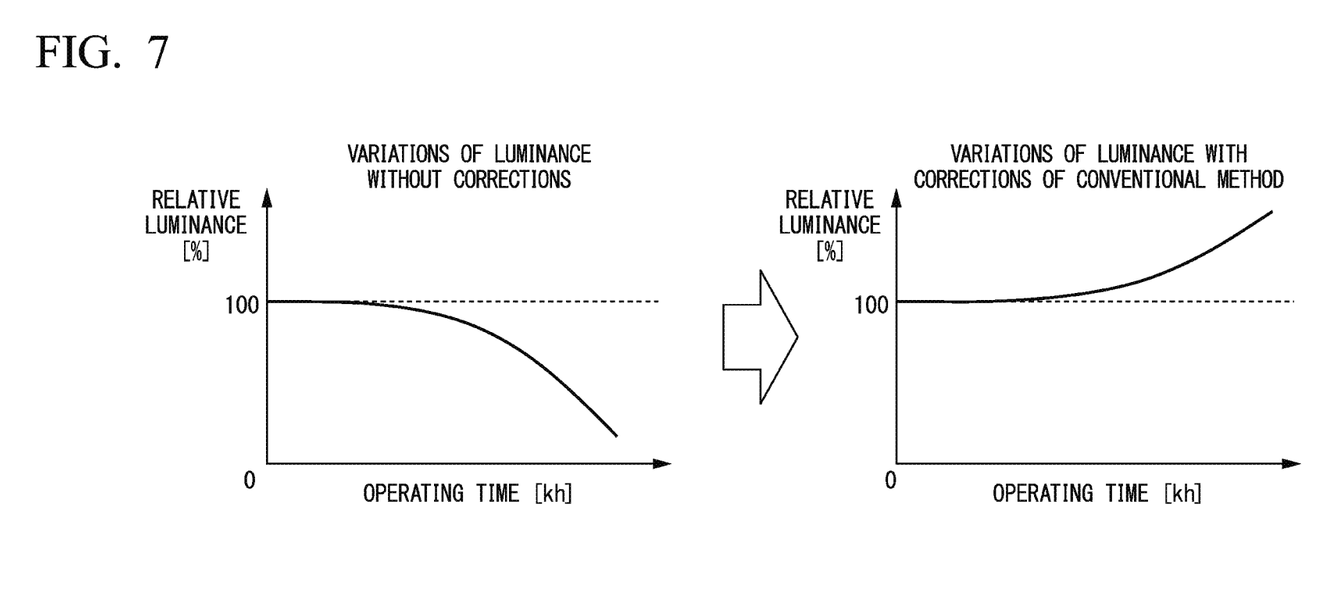
FIG. 7 includes graphs showing variations of luminance corrected by a conventional luminance correction method.

FIG. 7 show variations of luminance corrected by a conventional luminance correction method precluding a luminance sensor.

As shown in FIG. 7, manufacturers of panels and BL parts disclosed various types of information regarding standard values such as a half time of luminance at 30,000 hours and typical luminance characteristics at operating times (see the left-side graph of FIG. 7) with respect to a reduction of luminance on displays without corrections of luminance (i.e. a fixed value is used as a drive value to drive a display). However, manufacturers might measure luminance characteristics by continuously operating displays at maximum luminance; hence, different degradation characteristics can be detected in general usage statuses in which users may decrease luminance on screen. For this reason, the luminance will be excessively corrected according to the conventional method for adjusting a voltage applied to a backlight upon predicting the degradation of luminance solely depending on operating times (see the right-side graph of FIG. 7). When a display device is used for a long time in a power-saving mode (in which a backlight is set to be darker), for example, the luminance will be excessively corrected to increase the relative luminance.

On the other hand, the luminance adjustment device 4 according to one embodiment of the present invention is configured to predict the degradation speed according to the usage status of a screen and to thereby use the cubic value of the BL-drive value and the total of driving times of the video display 5 as the basis of prediction. Accordingly, it is possible to suppress the luminance from being excessively or insufficiently corrected by accurately predicting the degradation speed even in general usage statuses in which users may decrease the luminance on screen.

Next, the main configuration of the luminance adjustment device 4 according to one embodiment of the present invention will be described below.

Figure 8:
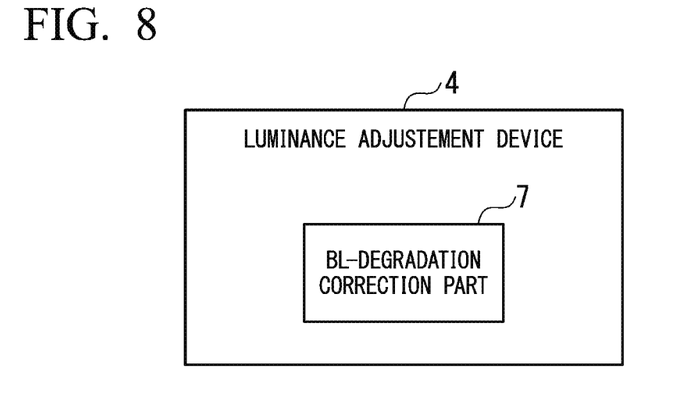
FIG. 8 is a block diagram showing a main configuration of the luminance adjustment device 4 according to one embodiment of the present invention.

FIG. 8 is a block diagram showing the main configuration of the luminance adjustment device 4 according to one embodiment of the present invention.

As shown in FIG. 8, the luminance adjustment device 4 includes the BL-degradation correction part 7.

The BL-degradation correction part 7 (i.e. a degradation correction part) corrects the used time of a light source of the video display 5 using the cube of a drive value, adds up the corrected used times to thereby produce the total used time of a light source, and thereby produce a BL-drive value based on the total used time and the luminance characteristics representing the relationship between the luminance and the used time of a light source which is stored in advance. Accordingly, it is possible for the luminance adjustment device 4 to improve a precision of correcting luminance with the video display 5 without using a luminance sensor. In addition, it is possible to achieve a reduction of power since it is unnecessary for the luminance adjustment device 4 to set a higher value of luminance to the video display 5 in anticipation of aging and degradation.

Figure 9:
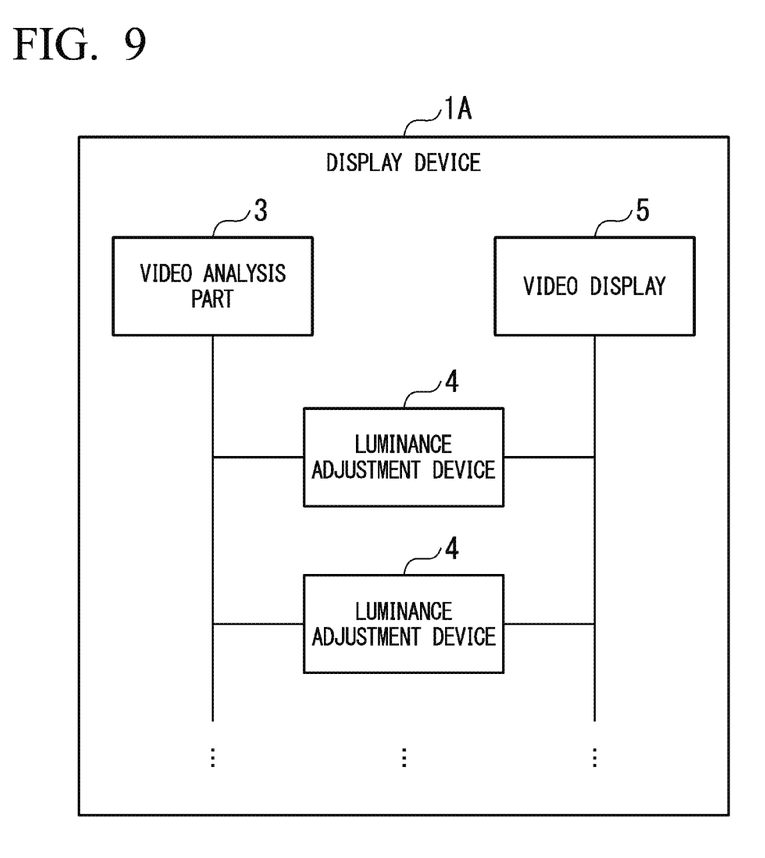
FIG. 9 is a block diagram showing a variation of a display device including the luminance adjustment device 4 according to one embodiment of the present invention.

A variation of the display device 1 according to one embodiment of the present invention will be described below. FIG. 9 is a block diagram showing a variation of the display device 1 including the luminance adjustment device 4 according to one embodiment of the present invention. A display device 1A according to a variation of the embodiment includes the video analysis part 3, a plurality of luminance adjustment devices 4, and the video display 5.

In the display device 1A, the screen of a backlight of the video display 5 is divided into a plurality of areas, wherein an automatic control is carried out to apply a large BL-drive value to an area corresponding to a bright video signal but to apply a small BL-drive value an area corresponding to a dark video signal. In addition, the display device 1A carries out an independent control for each of the divided areas of a backlight against aging and degradation. Accordingly, the display device 1A is provided with a plurality of luminance adjustment devices 4 for a plurality of areas of a backlight; hence, a series of steps S102 to S109 are carried out independently for each area.

As described above, the luminance adjustment method does not need to use a luminance sensor, and therefore the luminance adjustment method does not suffer from side effects against various usage statuses for the purpose of low luminance, low cost, and multi-screen fabrication; hence, the luminance adjustment method may normally provide corrections against aging and deterioration without making any settings including ON/OFF settings when embedded in general-purpose display products. In particular, the luminance adjustment method is applicable to BL-divided driving (e.g. local dimming) and multi-screen fabrication (e.g. tiling usage).

It is possible to realize the function of the luminance adjustment device 4 according to the foregoing embodiment with a computer. In this case, programs achieving the function of the luminance adjustment device 4 are stored on computer-readable storage media, and then programs stored on storage media are loaded into a computer system to execute the function. Herein, the term "computer system" may embrace an operating system and hardware such as peripheral devices. In addition, the term "computer-readable storage media" may refer to flexible disks, magneto-optical disks, ROM, portable media such as CD-ROM, storage devices such as hard-disk units embedded in compute systems. Moreover, the term "computer-readable storage media" may refer to any measures for dynamically retaining programs for a short period of time like networks such as the Internet and communication lines such as telephone lines for transmitting programs as well as any other measures for temporarily retaining programs like non-volatile memory embedded in computer systems acting as severs or clients. The aforementioned programs may achieve part of the foregoing functions, or those programs may achieve the foregoing function when combined with pre-installed programs of a computer system. Alternatively, those programs may be realized using programmable logic devices such as FPGA (Field Programmable Gate Array).

Heretofore, the foregoing embodiment of the invention has been described in detail with reference to the drawings, whereas concrete configurations should not be necessarily limited to the foregoing embodiment; hence, the present invention may embrace any types of designs without departing from the essential matter of the invention In devices, systems, programs, and methods recited in claims, descriptions, and drawings, their operations, procedures, steps, and orders of executing processes such as stages should not be explicitly labeled with specific terms such as "before" and "prior to"; hence, it is noted that those operations or processes can be embodied in an arbitrary order unless an output of a previous process needs to be used for a latter process. Even though operations or flows of processes recited in claims, descriptions, and drawings are labeled with specific terms such as "first" and "next" for the sake of convenience, it does not necessarily mean that operations or processes be essentially carried out in a specified order.

REFERENCE SIGNS LIST 1 display device
2 picture-quality setting part
3 video analysis part
4 luminance adjustment device
5 video display
6 initial BL-drive value generator (initial value generator)
7 BL-degradation correction part (degradation correction part)
8 BL driver
9 exponentiating calculation part
10 timer
11 stress time recorder
71 degradation characteristic correction part
72 drive value calculation part

The invention claimed is:

1. A luminance adjustment device configured to adjust a luminance of a light source of a display by controlling a drive value of the light source of the display, comprising:
a degradation correction part configured to calculate a luminance corresponding to the used time of the light source according to a predetermined luminance characteristic, to calculate the drive value according to the luminance, to correct and add, up the used time of the light source using a cubic value of the drive value, to correct the luminance, according to the predetermined luminance characteristic based on a total used time, and to thereby correct the drive value.

2. The luminance adjustment device according to claim 1, further comprising: an initial value generator configured to set an initial value of the drive value according to a usage status of the display, wherein the degradation correction part is configured to produce the drive value based on the luminance and the initial value of the drive value according to the luminance characteristic.

3. The luminance adjustment device according to claim 2, wherein the usage status of the display is determined based on at least one of a picture-quality setting value of the display and a video characteristic of a video input to the display.

4. The luminance adjustment device according to claim 1, wherein the drive value and the luminance are each expressed as a normalized value which is normalized in a range from "0" to "1".

5. The luminance adjustment device according to claim 1, wherein for each predetermined time, the degradation correction part is configured to correct the used time of the light source using the cubic value of the drive value, and add up the corrected used times to update the total used time.

6. The luminance adjustment device according to claim 1, wherein the degradation correction part is configured to adjust the luminance to be maintained.

7. A display device comprising:
a display; and
a luminance adjustment device configured to adjust a luminance of a light source by controlling a drive value of the light source of the display,
wherein the luminance adjustment device is configured to calculate, the luminance corresponding to the used time of the light source according to a predetermined luminance characteristic, to calculate the drive value according to the luminance, to correct and add up the used time of the light source using a cubic value of the drive value, to correct the luminance according to the redetermined luminance characteristic based on a total used time, and to thereby correct the drive value.

8. A luminance adjustment method configured to adjust a luminance of a light source of a display by controlling a drive value of the light source of the display, comprising:
calculating the luminance corresponding to the used time of the light source according to a predetermined luminance characteristics;
calculating the drive value according to the luminance;
correcting and adding up the used time of the light source using a cubic value of the drive value; and
correcting the luminance according to the predetermined luminance characteristic based on a total used time, thus correcting the drive value.

9. A computer-readable storage medium having stored therein a program causing a computer of a display device to implement the luminance adjustment method according to claim 8.

* * * * *